United States Patent Office 2,755,265
Patented July 17, 1956

2,755,265

PLASTIC COMPOSITIONS CONTAINING N,N-DISUBSTITUTED CARBONATO AMIDES

William L. Riedeman, Philadelphia, Pa., assignor to Rohm & Haas Company, Philadelphia, Pa., a corporation of Delaware No Drawing. Application December 1, 1954,
Serial No. 472,502

6 Claims. (Cl. 260—30.4)

This invention, which is a continuation-in-part of my application, Serial No. 421,439, filed April 6, 1954, relates to plastic compositions containing N,N-disubstituted carbonato amides of fatty acids which contain 16 to 22 carbon atoms. It relates to plastic compositions which contain, as plasticizers, those carbonato amides which have in the acid moiety thereof 16 to 22 carbon atoms and which have one or more carbonato groups having the formula

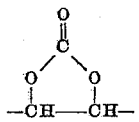

and which contain on the amido nitrogen atom two monovalent hydrocarbon groups — preferably alkyl groups—containing a total of 2 to 14 carbon atoms. More particularly it relates to vinyl resin compositions which contain N,N-disubstituted amides of carbonato-stearic acid having the general formula

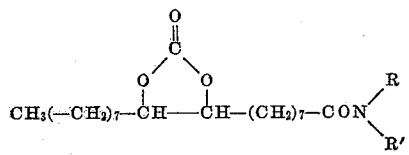

in which R and R' represent the same or different monovalent hydrocarbon groups, the total of whose carbon atoms is 2 to 14. Preferably R and R' represent alkyl groups.

The N,N-disubstituted carbonato amides which are employed in this invention are unusually high boiling liquids which are highly compatible with a wide variety of plastic materials. They are the subject of my application Serial No. 421,439 referred to above. By virtue of the presence of the carbonato groups in the fatty acid chains, they are far more compatible with plastic materials, such as cellulosic esters and vinyl halide resins than are the corresponding amides which do not contain carbonato groups. Accordingly, they are eminently suitable for use as plasticizers in plastic compositions.

In the preferred process for making the carbonato amides which are used in this invention, phosgene is reacted with an amide containing at least two hydroxyl groups on adjacent carbon atoms. Hydrogen chloride is split out and, therefore, the reaction is best carried out in the presence of an acceptor for hydrogen chloride. The starting material is an amide which contains one or more pairs of hydroxyl groups on adjacent carbon atoms of the aliphatic chain. Such intermediate polyhydroxy amides are made by known methods. For example, an amide of an unsaturated acid which contains one or more double bonds is reacted with hydrogen peroxide and a large excess of formic acid or acetic acid whereby an hydroxy-acyloxy derivative is produced. This, in turn, is converted to the polyhydroxy compound by hydrolysis of the acyloxy group or by alcoholysis.

It is now evident that the starting material from which the carbonato plasticizers are made are amides of acids which contain 16 to 22 carbon atoms and also contain one or more double bonds. Typical are the disubstituted amides of oleic, erucic, elaeostearic, linoleic, linolenic, clupanodonic, and palmitolenic acids. All of these acids occur in animal and vegetable oils, for example, in soybean, rapeseed, linseed, sardine and whale oils, and are readily obtained by the hydrolysis of the naturally occurring oils. This invention also embraces mixtures of amides such as those made from a mixture of fatty acids. Since all of these amides contain aliphatic unsaturation, they are readily converted first to the polyhydroxy derivative and thereafter to the carbonato products. It is preferred that all of the double bonds in any given amide be converted to carbonato groups. It has been found, however, that the carbonato group imparts to an amide such greatly enhanced solubility in, and compatibility with, plastic materials, particularly of the vinyl resin type, that it is not essential that every double bond be converted to a carbonato group. It is essential, however, that at least one double bond in each amide be thus converted.

The substituents, R and R', on the amido nitrogen atom are hydrocarbon groups, preferably alkyl groups. The groups can be the same or different but the total number of carbon atoms in the two groups should not exceed 14. Furthermore, the groups can be alkyl, aryl, cycloalkyl or aralkyl typified by the following: methyl, ethyl, n-propyl, n-butyl, sec.-butyl, tert-butyl, tert-amyl, n-octyl, 2-ethylhexyl, lauryl, myristyl, benzyl, phenyl, phenylethyl, and the isomers and homologues of these groups. The amides are obtained by reaction of a secondary amine with the unsaturated acid or the acid containing the hydroxyl groups and the substituents on the amido nitrogen atom are of course those originally present in the amine thus reacted. Such secondary amines are well-known and a wide variety of them is available commercially.

The carbonato amides which have already proven to be especially valuable as plasticizers for polyvinyl resins and which, therefore, have the greatest commercial value at the moment are those of 9,10-carbonatostearic acid having the formula

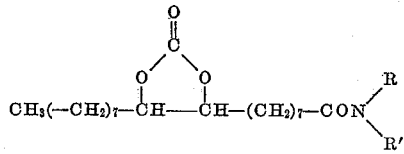

in which R and R' have the significance described above.

The reaction of phosgene with the polyhydroxy disubstituted amide is best carried out at a temperature from —10° C. to the boiling point of the reaction mixture. In commercial practice, it is preferred to carry out the reaction at a temperature from about —10° C. to about 60° C. because of the volatility of the phosgene. The phosgene may be reacted in the gaseous form with the amide; but a more satisfactory method appears to be that of reacting the amide with a solution of phosgene in an organic liquid, such as benzene, which is a solvent for the amide. It is most desirable that a mildly basic acceptor for hydrogen chloride be present; and for this purpose tertiary amines and weakly basic anion-exchange resins have each been used. Pyridine is very effective and its use is recommended at lower temperatures while anion-exchange resins are best used at higher temperatures. Other tertiary amines which can be used like pyridine include quinoline, isoquinoline, dimethylaniline, diethylaniline, trimethylamine, triethylamine, tri-n-butylamine, and the like. What is desired is that an acceptor be present which will take up the hydrogen chloride as fast as it is formed.

The plastic compositions of this invention which contain the N,N-disubstituted carbonato amides are flexible, tough and stable. The carbonato amides are extremely compatible with plastics—particularly with vinyl resins—and give rise to plasticized compositions which are extremely stable. Various quantities of the carbonato amides can be employed, depending on the degree of plasticization which is required and also depending on the amounts and kinds of other materials, such as fillers and extenders which may be present. While as little as 10% of a carbonato amide, based on the combined weight of the plastic material to be plasticized and said amide, exerts a softening effect, it is recommended that larger amounts be used. Thus in the preparation of unfilled and unpigmented compositions of high flexibility, the amount of the carbonato amide which is employed is of the order of 35% to 50%, on the same basis, when the carbonato amide is the sole plasticizer.

Other modifiers, such as dyes, pigments, extenders, mold lubricants, stabilizers and other plasticizers, including resinous plasticizers, can be present in the plastic compositions without departing from the spirit of this invention, which invention is one of providing plastic compositions containing carbonato di-substituted amides such as are described above.

The vinyl resins which are plasticized to advantage by the carbonato amides of this invention are more properly defined as "vinyl halide resins" and this term is herein used to embrace the following: polymers of vinyl halide, such as polyvinyl chloride or polyvinyl bromide; copolymers of a vinyl halide and a vinyl ester of a lower aliphatic acid, such as copolymers of vinyl chloride and vinyl acetate or vinyl propionate; copolymers of vinyl halides and vinylidene halides, such as copolymers of vinyl chloride and vinylidene chloride; and copolymers of a vinyl halide with other copolymerizable compounds containing a vinylidene group, $CH_2=C<$, such as ethyl acrylate, methyl methacrylate and the like. Preferred resins of this type are those which contain from about 60% to about 95% of copolymerized vinyl chloride and 5% to 40% of another copolymerized vinyl or vinylidene compound.

The following example illustrates the manner in which the compounds of this invention may be made. The example is drawn to the preparation and use of N,N-dimethyl-9,10-carbonato stearamide; but it is to be understood that the other amides embraced by this invention are prepared in the same manner and are employed in the same way in plastic compositions.

EXAMPLE 1

Into a reactor equipped with thermometer, agitator and condenser were charged 171.5 grams (0.5 mole) of N,N-dimethyl-9,10-dihydroxystearamide, 275 milliliters of toluene, and 110 grams of pyridine (1.4 moles). The stirred mixture was cooled to $-5°$ C. and to it was added over a period of one hour a cold ($0°$ C.) solution of 64.4 grams (0.65 mole) of phosgene in 250 milliliters of toluene. The mixture was stirred at $-5°$ C. for one-half hour and was then allowed to warm up to room temperature where it was maintained for 17 hours. The reaction mixture was thoroughly washed with water, stripped of solvent and fractionally distilled. The product, N,N-dimethyl-9,10-carbonatostearamide, was a pale oil which boiled at $262°$ C./1.1 mm. to $253°$ C./0.2 mm. and which had an index of refraction ($n_D^{25}$) of 1.4719. Its composition was confirmed by analysis (percent C: theory=88.25, analysis=88.45; percent H: theory=10.64, analysis=10.40; percent N: theory=3.79, analysis=3.63).

The following example illustrates the preparation and properties of the plastic compositions of this invention:

EXAMPLE 2

A thermoplastic composition was prepared by fluxing and milling at $325°$ F. the following materials: 60 parts of polyvinyl chloride (Geon 101); 40 parts of N,N-dimethyl-9,10-carbonatostearamide, prepared by the process of Example 1 above; 1 part of tribasic lead sulfate as a stabilizer; and 0.5 part of stearic acid as a lubricant.

Another thermoplastic composition was made for purposes of comparison by the process described immediately above with the exception that 40 parts of dioctyl phthalate, a widely used plasticizer, was employed in place of the N,N-dimethyl-9,10-carbonatostearamide. The two compositions were subjected to the following tests:

1. *Shore hardness.*—A Shore "A" Durometer, under a weight of three pounds is applied to the test specimens. A recording is made at once and after 10 seconds; and the hardness is expressed by the two values, the first of which is the higher.

2. *Gasoline extraction.*—Weighted samples are immersed in white, lead-free gasoline at $25°$ C. for 60 minutes, after which they are thoroughly dried and re-weighed. The loss in weight, expressed as the percentage of the original weight, is a measure of the amount of plasticizer which has been extracted by the gasoline.

3. *Activated carbon volatility.*—Individual specimens are placed between 2″ layers of activated charcoal in sealed glass jars which are maintained at $90°$ C. for 24 hours. The specimens are removed, dusted free of carbon, and re-weighed. Here again the loss in weight is a measure of the amount of plasticizer which has been removed by the carbon.

4. *Fade-O-Meter test.*—Specimens are exposed in an Atlas Fade-O-Meter at $110°$ F. and changes in their appearance are recorded. The results of these tests performed on the two above-described compositions are here tabulated:

*Tabulation*

| Test | Composition Containing N,N-dimethyl-9,10-Carbonatostearamide | Composition Containing Dioctyl Phthalate |
| --- | --- | --- |
| Hardness | 58–53 | 70–65 |
| Gasoline Extraction (loss) percent | 6.4 | 24.8 |
| Activated Charcoal (loss) do | 1.0 | 8.2 |
| Fade-O-Meter: | | |
| Definite Tack hours | ca. 90 | ca. 45 |
| Definite Discoloration do | ca. 90 | ca. 45 |

As is evident from the above tabulation, N,N-dimethyl-9,10-carbonatostearamide is a good plasticizer for polyvinyl chloride compositions. It provides compositions which are characterized by exceptional stability. Furthermore, all of the compositions embracing vinyl resins and the carbonato amides described display the same desirable properties.

I claim:

1. A composition comprising a vinyl halide resin and, as a plasticizer therefor, an N,N-disubstituted carbonato-amide which contains in the acid moiety thereof 16 to 22 carbon atoms and which also contains in the acid moiety from one to three carbonato groups.

and which contains on the amido nitrogen atom two monovalent hydrocarbon radicals which together contain a total of 2 to 14 carbon atoms.

2. A composition comprising a vinyl halide resin and, as a plasticizer therefor, an N,N-disubstituted carbonatoamide which contains in the acid moiety thereof 16 to 22 carbon atoms and which also contains in the acid moiety from one to three carbonato groups.

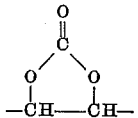

and which contains on the amido nitrogen atom two alkyl radicals which together contain a total of 2 to 14 carbon atoms.

3. A composition comprising a vinyl halide resin and, as a plasticizer therefor, N,N-dimethyl-9,10-carbonatostearamide.

4. A composition comprising polyvinyl chloride and, as a plasticizer therefor, an N,N-disubstituted carbonatoamide which contains in the acid moiety thereof 16 to 22 carbon atoms and which also contains in the acid moiety from one to three carbonato groups.

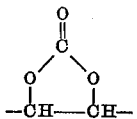

and which contains on the amido nitrogen atom two monovalent hydrocarbon radicals which together contain a total of 2 to 14 carbon atoms.

5. A composition comprising polyvinyl chloride and, as a plasticizer therefor, an N,N-disubstituted carbonatoamide which contains in the acid moiety thereof 16 to 22 carbon atoms and which also contains in the acid moiety from one to three carbonato groups.

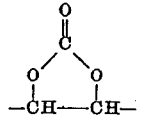

and which contains on the amido nitrogen atom two alkyl radicals which together contain a total of 2 to 14 carbon atoms.

6. A composition comprising polyvinyl chloride and, as a plasticizer therefor, N,N-dimethyl-9,10-carbonatostearamide.

No references cited.